United States Patent [19]
Kim

[11] Patent Number: 5,944,331
[45] Date of Patent: Aug. 31, 1999

[54] CHUCK ADAPTER

[76] Inventor: Johnny Kim, P.O. Box 665, Lodi, N.J. 07644

[21] Appl. No.: 09/123,024

[22] Filed: Jul. 27, 1998

[51] Int. Cl.[6] ..................................................... B23B 25/06
[52] U.S. Cl. ........................................... 279/154; 279/123
[58] Field of Search ............................. 279/123, 152–154

[56] References Cited

U.S. PATENT DOCUMENTS

| | | | |
|---|---|---|---|
| 3,160,042 | 12/1964 | Grand | 82/34 |
| 3,167,325 | 1/1965 | Buck | 279/1 |
| 3,575,435 | 4/1971 | Lemanski | 279/123 |
| 3,610,643 | 10/1971 | Thompson | 279/1 |
| 4,223,898 | 9/1980 | Righi | 279/1 |
| 4,277,073 | 7/1981 | Ferguson | 279/1 |
| 4,556,228 | 12/1985 | Ferraro | 279/1 |
| 4,696,482 | 9/1987 | Brown | 279/1 |
| 4,746,131 | 5/1988 | Mathes | 279/1 |
| 4,772,034 | 9/1988 | Brown | 279/1 |

OTHER PUBLICATIONS

Jaw Boring Ring Advertisement, Jan. 1998.
Jaw Boring Star Set Advertisement, Jan. 1998.

*Primary Examiner*—Steven C. Bishop
*Attorney, Agent, or Firm*—Friscia & Nussbaum

[57] ABSTRACT

The master jaws in a three jaw chuck are located and maintained in position by a spacer having two plates which are located adjacent one another along edges which are inclined approximately 7° from the vertical. One plate is generally rectangular. The other plate is generally trapezoidal. Sliding the plates along the inclined edges positions one edge of the rectangular plate against one of the master jaws and the two edges of the generally trapezoidal plate against the other two master jaws. The relative movement of the plates changes the position of the outer edges of the plates which allows for the master jaws to make contact with the plates at different positions to allow for positioning of the soft jaws for machining.

15 Claims, 2 Drawing Sheets

CHUCK ADAPTER

BACKGROUND OF THE INVENTION

1. Field of the Invention

The present invention generally relates to a chuck adapter for a turning machine, and more particularly to an adjustable chuck adapter for retaining the soft jaws of a turning machine three jaw chuck in position for subsequent machining the inner diameter or outer diameter of the soft jaws to a proper size for supporting a workpiece.

2. Related Art

C.N.C. turning machines utilize chucks to hold a workpiece in position for machining. Typical of such chucks is a three-jaw chuck, each jaw having a master jaw and soft jaw component, where each soft jaw is secured on top of a master jaw of the chuck. The soft jaws must be machined to fit a workpiece to securely hold the workpiece for machining. The soft jaws are machined by rotation of the chuck mounted on the spindle of the lathe. Accordingly, the soft jaws must be secured in a proper position for machining.

Recently, Computer Numerical Controlled (C.N.C.) turning machines have come into widespread use. Such devices are extremely accurate and produce parts faster and with much better finish than was heretofore possible. The introduction of these devices caused chuck manufacturers to make chucks which require much greater holding pressure per jaw. For example, most of the power chucks available today are hydraulic or air and involve a holding pressure per jaw which could exceed 350 p.s.i. This high pressure is required to hold the parts of the jaws securely so as to withstand the high RPM of the C.N.C. turning machines in use today.

Accordingly, what is needed, and has not heretofore been provided, is a device for positioning soft jaws for machining which is simple, quick and easy to use, but is strong enough to be used with modern turning machines.

Previous efforts have arrived at different devices for locking the soft jaws in required positions for the purpose of machining the jaws to fit the workpiece at fill chuck pressure to provide to adjustment of the jaws in locking position for the exact amount of metal removal desired. These previous efforts include:

Brown, U.S. Pat. No. 4,772,034, which discloses a soft jaw construction for a lathe chuck for engagement by the studs of an adjustable lock ring device for holding the jaws during the machining thereof. The device comprises a ring arrangement to encircle the soft jaws. The ring has radially extending holes for alignment with the axis of the radial movement of the soft jaws. Studs are secured through the hole of the ring and extend into the soft jaws. Micrometer graduated nuts are utilized to limit the radial inward movement of the soft jaws to locate the soft jaws at a desired position for machining.

Mathes, U.S. Pat. No. 4,746,131, discloses an apparatus for internal chucking of a soft three-jaw chuck on lathes. The device includes two rotatable triangular clamping plates disposed in a preselected rotational position respect to each other. By rotating the triangles with respect to each other, and positioning the soft jaws along the sides of the triangle, the size of the chuck is varied based on the respective positions of the side walls so that a large number of sizes can be achieved with a single chuck.

Brown, U.S. Pat. No. 4,969,482 discloses a soft jaw construction for a lathe chuck for engagement by the studs of an adjustable lock ring device for holding the jaws during the machining thereof. The device comprises a ring arrangement to encircle the soft jaws. The ring has radially extending holes for alignment with the axis of the radial movement of the soft jaws. Studs are secured through the hole of the ring and extend into the soft jaws. Micrometer graduated nuts are utilized to limit the radial inward movement of the soft jaws to locate the soft jaws at a desired position for machining.

Ferraro, U.S. Pat. No. 4,556,228, discloses a jaw locking mechanism comprising slots extending across the bottom of the soft jaws which accept members which have lock down means associated therewith. Accordingly, the soft jaws are positioned and then locked down into position by actuating leg members which frictionally engage the chuck base.

Ferguson, U.S. Pat. No. 4,277,073, discloses a soft chuck jaw comprising a hardened jaw body having a wedge locking means thereon and an insert of soft expendable material retained therein. By utilizing a hardened jaw body having a wedge locking means thereon, the insert, which is expendable, may be formed from cold formed stock material which has the required surface accuracy, thus merely requiring the cold formed stock material to be cut to the desired length and be square on one cut edge.

Righi, U.S. Pat. No. 4,223,898, discloses a retainer device for chuck jaws having a carrier ring with a plurality of blocking slides, each slide carrying a double-hook element presenting two inwardly directed hook arms. When the retainer device is installed against chuck jaws, the double-hook element engages from both sides the steel jaw and blocks movement of the steel jaws past a desired working condition.

Thompson, U.S. Pat. No. 3,610,643, discloses a chuck adapter for locking a chuck internally into a hollow tube. The chuck adapter comprises a generally cylindrical shell having a flanged mouth and a plurality of longitudinal openings in the surface thereof. A plurality of radially movable gripping bars is pivotally or slidably mounted within the shell and has cam surfaces thereon. An axially movable member having tapered surfaces thereon is slidably mounted in the shell and the tapered surfaces are adapted to engage the cam surfaces of the bars to move the bars radially outward of the shell upon engagement of an axial end of the axially moveable member with the end of a chuck. This invention has applicability to the paper roll industry.

Lemanski, U.S. Pat. No. 3,575,435, discloses a set of attachments for the chuck of a lathe. The attachments include two forms of soft jaws that attach on a hard jaw. A set of shims is provided for gripping and positioning a ring-shaped workpiece on stepped jaws. Two forms of stops are provided for positioning the end of the workpiece in selected positions in the jaws. An adopter is provided having a friction surface and magnetic means for engaging and longitudinally supporting the end of a workpiece that cannot normally be engaged between the jaws.

Buck, U.S. Pat. No. 3,167,325, discloses a carriage fastened to the base of a chuck having radially moveable force receiving means engagable by the chuck jaws for actuation upon appropriate inward or outward movement of the jaws.

Grand, U.S. Pat. No. 3,160,042, discloses a jaw holding device comprising a rigid ring between the soft jaws which has a multiplicity of radially extending and radially adjustable projections to restrain radial movement of the jaws during rotation and turning thereof to size.

However, these previous efforts have developed generally cumbersome devices that are not quickly and easily adjustable.

OBJECTS AND SUMMARY OF THE INVENTION

A principal object of the present invention is to provide a simple spacer, or chuck adapter, for locating the jaws in a three-jaw chuck.

Another object of the present invention is to provide a spacer for a chuck that uses two plates located side by side.

Another object of the present invention is to provide a spacer for a three-jaw lathe chuck that is quickly and easily adjustable.

Still a further object and advantage of the present invention is to provide a chuck spacer or adapter that includes two plates positioned side by side which are moveable with respect to each other to adjust the overall effective diameter of the space occupied by the two plates together.

Another object and advantage of the present invention is to provide a chuck spacer or adapter having two plates with outer edges which contact the master jaws of a chuck to position the soft jaws.

Still even a further object and advantage of the present invention is to provide a spacer or adapter for a chuck having two plates with outer edges, for which outer edges are located by sliding the two plates along complementary inclined surfaces of each plate.

Still even an additional object of the present invention is to provide a chuck spacer which contacts interior edges of master jaws extending beyond the plane of the chuck, but which spacer is cleared by the soft jaws.

It is still even another object of the present invention to provide a chuck spacer having markings for indicating the size of the diameter of the space occupied by the spacer.

Another object of the present invention is to provide a chuck spacer having two plates wherein one plate is generally rectangular in shape.

An additional object of the present invention is to provide a chuck spacer having two plates wherein one plate is generally trapezoidal in shape.

It is still even a further object of the present invention to provide a chuck spacer which can be used to space soft jaws for machining the inside or outside diameter thereof.

The present invention generally relates to a chuck adapter comprising a two piece assembly. The pieces are in the form of plates having a plurality of edges, one edge on each plate being placed together. The plates are moveable with respect to each other by sliding them along the edges placed together. The pieces are shaped so that movement with respect to each other changes the position of the outer edges to adjust the overall size of the device, i.e. the overall diameter of the space occupied by the device. The outer edges of the plates contact interior edges of the master jaws of a chuck to hold the master jaws, and thereby the soft jaws, in proper position for machining either the inside diameter or the outside diameter. Importantly, the invention allows for retaining the soft jaws in numerous positions quickly and easily, by using the invention with a three jaw chuck, for machining soft jaws to a proper size for holding a workpiece.

The preferred embodiment of the present invention includes two irregularly shaped four-sided plates that slidably contact each other in the space formed between the three master jaws of a three-jaw chuck. Positioning the two plates relative to each other and to the three master jaws permits the master jaws to be tightened and secured against outer edges of the invention, thereby spacing and retaining the soft jaws in locations required for accurate machining of the soft jaws.

BRIEF DESCRIPTION OF THE DRAWINGS

Other important objects and features of the invention will be apparent from the following Detailed Description of the Invention taken in connection with the accompanying drawings in which.

DETAILED DESCRIPTION OF THE INVENTION

Figure 1:
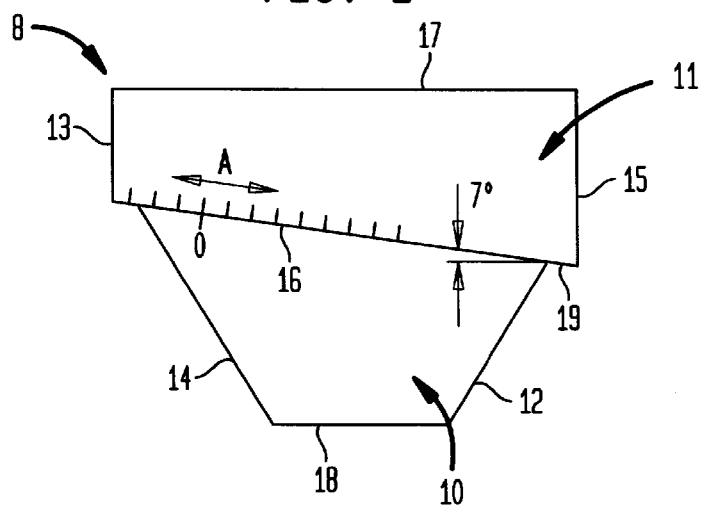
FIG. 1 is a top plan view of the present invention.

As shown in FIG. 1, the device of the present invention, generally indicated at 8, includes first and second plates 10 and 11. First plate 10 is generally trapezoidal in shape. As used herein, generally trapezoidal is defined as a quadrilateral having no parallel sides. As shown in FIG. 1, first plate 10 has non-parallel sides 12 and 14 and non-parallel sides 16 and 18. The angular dimensions of a preferred embodiment of first plate 10 are:

| | |
|---|---|
| 1. Angle Between Sides 14 and 18 | 120°; |
| 2. Angle Between Sides 18 and 12 | 120°; |
| 3. Angle Between Sides 12 and 16 | 67°; and |
| 4. Angle Between Sides 16 and 14 | 53° |

Second plate 11 is generally rectangular in shape. As used herein, generally rectangular is defined as a four-sided plane figure with two right angles. Second plate 11 has parallel sides 13 and 15 and non-parallel sides 17 and 19.

The angular dimensions of a preferred embodiment of second plate 11 are:

| | |
|---|---|
| 1. Angle Between Sides 19 and 15 | 83°; |
| 2. Angle Between Sides 15 and 17 | 90°; |
| 3. Angle Between Sides 13 and 17 | 90°; and |
| 4. Angle Between Sides 13 and 19 | 97° |

Figure 2:
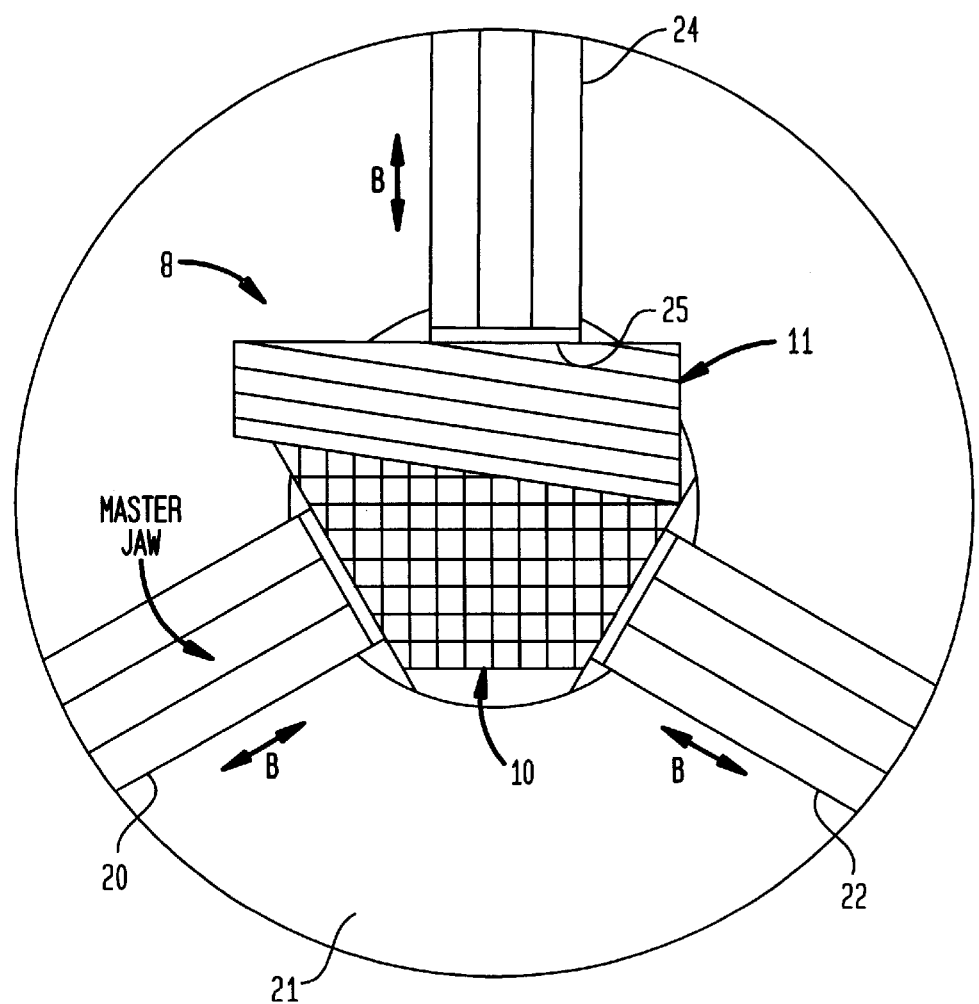
FIG. 2 is a top plan view of the invention shown in FIG. 1 positioned between the jaws of a three-jaw lathe.
Figure 3:
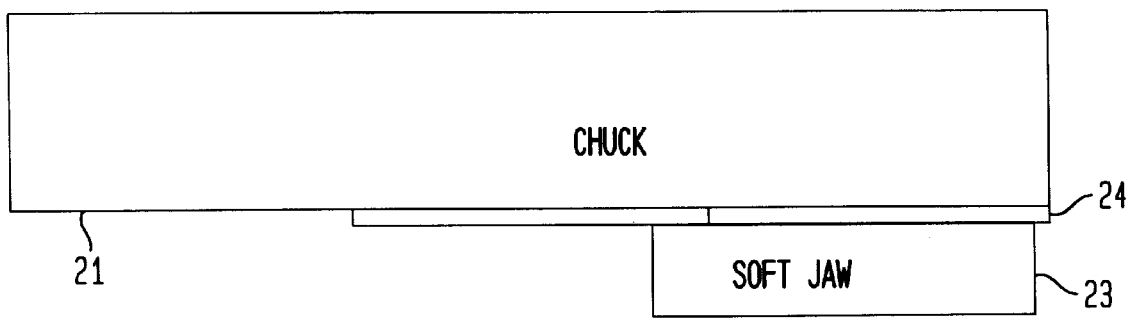
FIG. 3 is a side plan view of a portion of the invention of FIG. 2.

FIG. 2 is a top view of the invention positioned on a chuck body 21. The chuck body 21 has three jaw chuck includes master jaws 20, 22, and 24 attached to the chuck body 21 in the usual manner known in the art. Master jaws 20, 22 and 24 have soft jaws affixed thereon, as is also known in the art. One of the soft jaws is shown at 23 in FIG. 3. As is known in the art, a portion of face 25 of the master jaw 24 extends past the face of the chuck body 21, and the soft jaw 23 positioned on the master jaw 24 extends past the portion of face 25 of master jaw 24. As is known in the art, the master jaws 20, 22 and 24 are moveable with respect to each other as indicated by arrows B in FIG. 2. Additionally, it should be noted that movement of the soft jaws attached to the master jaws also occurs when the master jaws are moved.

The plates 10 and 11 are positioned to be placed on the face of the chuck 21 and to contact the portion of the faces 25 of the master jaws 20, 22 and 24 extending past the face of chuck body 21. Each of the master jaws is then positioned by fixing the position of the master jaw relative to the location of the other master jaws. Because the soft jaws are attached to the master jaws, their location is also fixed. The location at which the soft jaws are fixed is a function of the diameter size of the space occupied by the device of the present invention.

As desired, the edges of each of the plates 10 and 11 may be roughened to inhibit slippage against the surfaces of the master jaws and against each other. Also, the plates may be marked as shown in FIG. 1 to indicate distances. With the configuration shown in FIG. 1, there are quarter inch markings and movement of the plates one quarter of an inch with respect to each other corresponds approximately to a change in the diameter of the device in the amount of approximately 1/64" (one sixty-fourth of an inch).

In operation, the two sides 16 and 19 of plates 10 and 11 are caused to abut one on the other. The two plates 10 and 11 can be moved with respect to each other in the direction of arrow A along the sides 16 and 19 thereby causing the side 17 of plate 11, the side 14 of plate 10, and the side 12 of plate 10 to contact the master jaws 20, 22 and 24 as shown in FIG. 2. When the sides 17, 14 and 12 have positioned the jaws 20, 22, 24, the jaws are tightened against the edges of the plates 10 and 11. This fixes the location of the master jaws, and accordingly, also affixes the location of the soft jaws. Now, the soft jaws can be machined to a proper size for fitting the workpiece to hold the workpiece for machining. It should be noted that the inner or outer diameter of the soft jaws can be machined in any manner known in the art as the device of the present invention does not interfere with the machining of the inner or outer diameter of the soft jaws.

It should be noted that it is preferable to have sides 16 and 19 formed to extend at an angle of approximately 7° (seven degrees). If the angle is much less, movement of the plates does not substantially increase or decrease the effective size of the device. If the angle is much greater, movement of the plates could cause sides 19 and 15 to contact and interfere with jaw 22.

Figure 4:
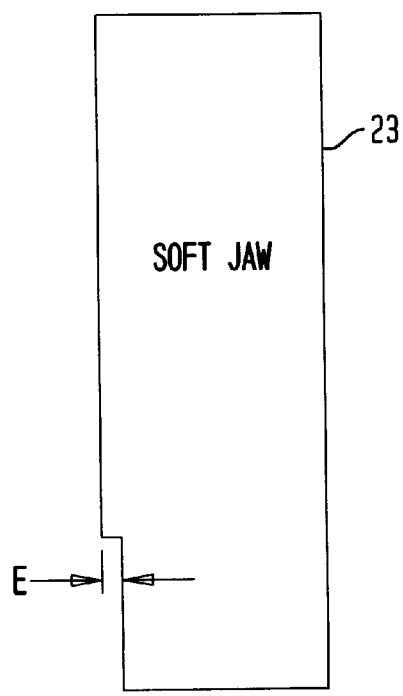
FIG. 4 is a side plan view of an embodiment of a soft jaw with a recessed area for use with the invention shown in FIG. 1.

Referring now to FIG. 4, it should be noted that if there is not enough clearance between the soft jaw and the face of the chuck to receive the device of the present invention, a portion of the soft jaw can be machined off to allow for proper spacing. Typically, the soft jaws have a recess of approximately 1/16" (one sixteenth of an inch). If the master jaw does not extend far enough past the face of the chuck, the combination of the master jaw and the 1/16" (one sixteenth of an inch) on the soft jaw may not provide clearance for the device of the present invention. Accordingly, it may be desirable to further machine additional material from the soft jaws, even as little as 1/16" (one sixteenth of an inch), to bring the clearance of the soft jaw up to 1/8" (one eight of an inch) to allow for clearance of the device of the present invention (see Arrow E).

It is to be understood that the present invention is not limited to the specific geometric shapes of the plates used in the preferred embodiments. The use of the terms "trapezoidal" and "rectangular" are intended not as limitations but rather to generally convey the shapes of the parts to which they refer.

Having thus described the invention in detail, it is to be understood that the foregoing description is not intended to limit the spirit and scope thereof. What is desired to be protected by Letters Patent is set forth in the appended claims.

What is claimed is:

1. A chuck adapter apparatus comprising:
   a first generally trapezoidal plate;
   a second generally rectangular plate, said first plate and said second plates being operatively associated with each other in side by side relationship, said plates being moveable with respect to each other; and
   means associated with said plates for positioning said plates in the space between the jaws of a lathe to hold said jaws in a position determined by the location of said plates.

2. The chuck adapter of claim 1 wherein said generally trapezoidal plate has four sides intersecting at the internal angles of 120°, 120°, 67°, and 53°.

3. The chuck adapter of claim 1 wherein said generally rectangular plate has four sides intersecting at the internal angles of 83°, 90°, 90°, and 97°.

4. The chuck adapter of claim 1 wherein said plates abut each other along respective inclined edges on each of said plates which are inclined at an angle of about seven degrees with respect to the vertical.

5. A spacer apparatus to retain the three jaw chuck at a desired position for machining the soft jaws of the chuck, said spacer comprising:
   first generally rectangular plate means having four edges, three of said edges being generally orthogonal and the remaining edge being inclined an angle of about 7° with respect to the vertical, at least one of said edges being capable of contacting at least one lathe jaw; and
   second generally trapezoidal plate means having four edges, three of said edges being generally trapezoidal and the remaining edge being inclined at an angle of about 7° with respect to the vertical for abutting against said the corresponding edge of said first plate means, two of said edges being capable of contacting the remaining lathe jaws to hold said jaws in position.

6. A spacer apparatus for maintaining the master jaws of three jaw chuck in position for machining soft jaws, said spacer comprising:
   two plates located adjacent one another;
   each of said plates having at least one edge formed thereon; and
   said plates being slidable along said edges so that other edges of said plates contact the master jaws.

7. The apparatus of claim 6 wherein the other edges define an overall diameter of the plates and slidable movement of said plates along said edges moves the other edges to change the overall diameter of the plates.

8. The apparatus of claim 7 wherein said edges are inclined approximately seven degrees from horizontal.

9. The spacer of claim 8 wherein one of said plates is generally rectangular in shape and the other of said plates is generally trapezoidal in shape.

10. The spacer of claim 9 wherein sliding said plates along said inclined edges positions at least one other edge of said rectangular plate against one of the master jaws and at least two other edges of said generally trapezoidal plate against the other two master jaws.

11. The spacer of claim 8 wherein each of said plates are marked to indicate distances.

12. The spacer of claim 11 wherein said markings are placed along at least one of said inclined edges.

13. The spacer of claim 12 wherein said markings are placed so that movement of said plates along said inclined edges from one of said markings to another corresponds to a change in the outer diameter of said spaces of approximately 1/64".

14. A method of positively positioning soft jaws for machining comprising the steps of:
- providing a first plate with an inclined sliding edge and a master jaw contact edge;
- providing a second plate with an inclined sliding edge and two master jaw contact edges;
- contacting the inclined sliding edges of the first and second plates;
- sliding the first and second plates with respect to each other to adjust the relative positions of the master jaw contact edges to a desired position; and
- tightening the master jaws to contact the master jaw contact edges.

15. The method of claim 14 further comprising the step of providing markings on the inclined sliding edges, which markings correspond to relative postions of the master jaw contact edges.

* * * * *